(12) United States Patent
Rehmert

(10) Patent No.: US 6,284,010 B1
(45) Date of Patent: Sep. 4, 2001

(54) ADJUSTABLE AIR FILTER ASSEMBLY FOR A PERSONAL COMPUTER

(76) Inventor: Susan Skae Rehmert, 4003 Zapotec Way, Las Vegas, NV (US) 89103

( * ) Notice: Subject to any disclaimer, the term of this patent is extended or adjusted under 35 U.S.C. 154(b) by 0 days.

(21) Appl. No.: 09/440,007

(22) Filed: Nov. 12, 1999

Related U.S. Application Data

(60) Provisional application No. 60/108,794, filed on Nov. 17, 1998.

(51) Int. Cl.[7] .................................................... B01D 29/05
(52) U.S. Cl. ...................... 55/385.6; 55/496; 55/DIG. 31
(58) Field of Search ................................ 55/385.1, 385.6, 55/496, DIG. 31

(56) References Cited

U.S. PATENT DOCUMENTS

| | | |
|---|---|---|
| 2,175,903 * 10/1939 | Lichtman | ................................ 55/496 |
| 4,659,349   4/1987 | Rodi et al. . | |
| 4,751,872   6/1988 | Lawson, Jr. . | |
| 4,889,542  12/1989 | Hayes . | |
| 5,121,291   6/1992 | Cope et al. . | |
| 5,163,870  11/1992 | Cooper . | |
| 5,600,090   2/1997 | Morris . | |
| 5,772,713 * 6/1998 | Salinas et al. | .......................... 55/496 |
| 5,827,340 * 10/1998 | Fiske | ................................. 55/385.6 |

* cited by examiner

*Primary Examiner*—David A. Simmons
*Assistant Examiner*—Robert A. Hopkins
(74) *Attorney, Agent, or Firm*—Kenneth L Tolar

(57) ABSTRACT

An adjustable air filter assembly for a personal computer includes a substantially U-shaped frame member formed of a telescoping transverse arm having a pair of telescoping side arms extending therefrom. Accordingly, the width and length of the frame can be selectively varied to peripherally border varying size air intake vents on a computer housing. An adjustable filter element is slidably received within the frame member.

4 Claims, 1 Drawing Sheet

ADJUSTABLE AIR FILTER ASSEMBLY FOR A PERSONAL COMPUTER

The following specification is entitled to the benefit of the filing date of Provisional Application No. 60/108,794 filed on Nov. 17, 1998.

BACKGROUND OF THE INVENTION

The present invention relates to a filter assembly for protecting the internal components of a personal computer from airborne particles.

DESCRIPTION OF THE PRIOR ART

A personal computer (PC) generally includes a housing having a variety of electronic components, including a power supply and a central processing unit (CPU) therein. A fan is also disposed within the housing for circulating ambient air therethrough via an intake vent to remove heat generated by the internal components. The incoming air often includes particulates such as dirt, dust, and other airborne particles which adhere to the fan and the other internal components of the PC. Eventually, the accumulation of these particles within the PC reduces air circulation and heat dissipation, thereby increasing the risk of damage to the internal components. The present invention provides an adjustable filter assembly for removing airborne particulates from the incoming air.

The prior art includes a number of inventions designed to prevent dirt, dust and the like from accumulating on or within electronic devices such as PCs. However, none of these devices are adjustable to fit varying size intake vents. For example, U.S. Pat. No. 5,600,090 issued to Morris discloses a filter for a computer housing including an open cell synthetic foam sheet formed into a bonnet like arrangement by an elastic strap. The cover is placed over the disc slots to protect the computer interior.

U.S. Pat. No. 5,163,870 issued to Cooper discloses a protective enclosure that completely covers a computer. The enclosure has an open bottom with a compressible seal member thereabout that engages the surface on which the computer is resting.

U.S. Pat. No. 5,121,291 issued to Cope et al discloses a ventilation system for a portable computer including an exhaust fan positioned so that it increases the air flow to the power supply.

U.S. Pat. No. 4,889,542 issued to Hayes discloses a computer air filter device and method including a filter panel adhesively attached to a computer housing to cover the air intake grids.

U.S. Pat. No. 4,751,872 issued to Lawson, Jr. discloses a ventilation system for a PC including two fans attachable to a computer housing.

U.S. Pat. No. 4,659,349 issued to Rodi et al discloses a filter unit for various equipment including a filter having a means for redirecting the ventillating air flow.

As indicated above, various filter assemblies for personal computers exist. None of the above inventions, however, provide all of the benefits according to the present invention. In particular, none of the above devices include a frame mounted filter assembly that can be easily mounted over the air intake vent of a PC to remove particulates from incoming air. Furthermore, none of the above devices include an adjustable frame and an adjustable filter element for allowing a single filter assembly to be used with various computers having varying dimensioned air intake vents.

SUMMARY OF THE INVENTION

The filter assembly of present invention comprises a frame that is peripherally attached to the air intake vent of a computer housing. A filter element is slidably received within the frame for removing particulates from air entering the vent. The length and width of the frame are adjustable allowing the frame to be modified to fit various size vents and the size of the filter element can be modified accordingly.

It is therefore an object of the present invention to provide a filter assembly that can be adjusted to fit computers having different air vent sizes. It is another object of the present invention to provide a filter assembly for a computer that includes easily replaceable filter elements. It is yet another object of the present invention to provide a filter assembly that can easily be installed.

It is yet another object to provide a filter assembly attachable to computers having either bottom or rear mounted air intake vents.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
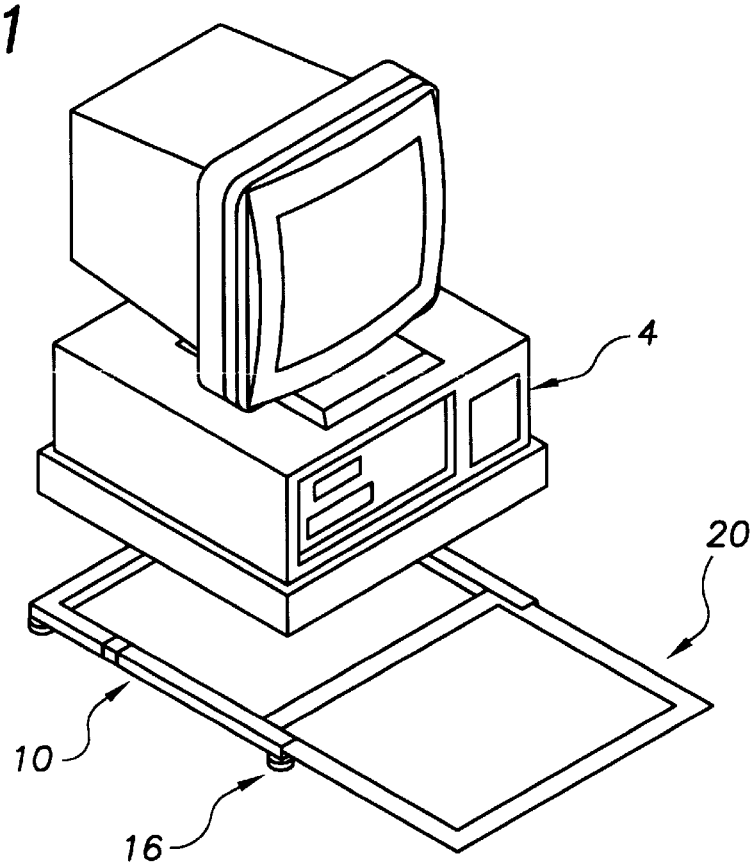
FIG. 1 is a perspective, enlarged view of an air filter assembly according to the present invention.
Figure 2:
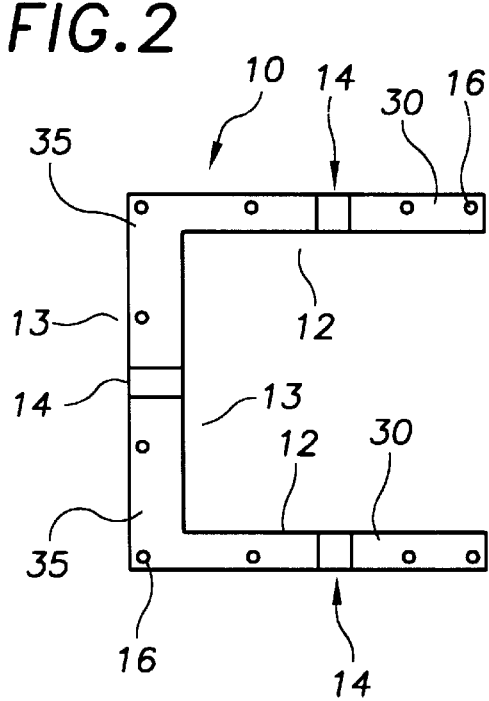
FIG. 2 is an enlarged bottom view of the adjustable frame.
Figure 3:
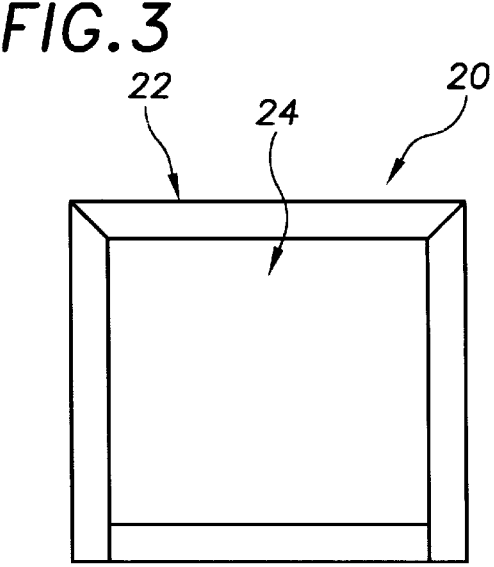
FIG. 3 is an enlarged top view of the filter element.

Referring now to FIGS. 1 through 3, the preferred embodiment of the present invention relates to an air filter assembly for a computer. A computer typically includes a hollow housing 4 having various internal components received therein. One or more air intake vents are typically disposed on the rear or bottom wall of the computer housing for delivering ambient air to the internal components. The present invention relates to a filter assembly for preventing particulates from passing through air intake vent of a computer of the type described above. The air filter assembly comprises an adjustable, substantially U-shaped frame 10 made from a durable yet inexpensive material, such as plastic. The frame 10 includes a pair of parallel side arms 12 with a third arm 13 perpendicularly disposed therebetween, each having a substantially C-shaped cross-sectional configuration thereby providing a channel for slidably receiving an air filter element 20.

The arms are formed with a pair of L-shaped sections 35 each having an elongated male portion 14 extending a first end thereof. The male portions are slidably received within the channel defined by a second side arm section 30. A similar male portion extends from a second end of one of the L-shaped sections and is slidably received within the second end of the other L-shaped section. Each male portion 14 also has a substantially C-shaped cross-sectional configuration and is dimensioned slightly less than the arm sections so that the arm sections are easily slidable thereabout. The arm sections may also include a locking means such as locking pins, bolts or similar devices for fixing the arms at a desired length. Both the length and width of the frame 10 is therefore adjustable to fit different size air intake vents. The frame 10 is peripherally attached about the air intake vent, preferably with mating hook and loop fasteners, such as VELCRO™, or any other conventional means.

The frame 10 may also include a plurality of foot pads 16 spaced along the lower surface thereof for use with a computer having an air intake vent at the bottom of the housing 4. The foot pads 16 facilitate airflow to the air filter by suspending the frame 10 a predetermined distance above a support surface. The foot pads 16 are preferably made from a soft but sturdy material, such as rubber, to protect the support surface from abrasions.

The air filter assembly further comprises a filter element 20 that is slidably received within the C-shaped arms of the frame 10 to prevent particulates in the air from entering the vent. The filter element 20 includes a substantially rigid rectangular border 22 peripherally attached to a centrally disposed panel 24. The border 22 is made of a material that may easily be trimmed, such as cardboard, allowing the filter element to be adjusted to tightly fit within the frame. Therefore, the border has sufficient width to be trimmed to fit within the frame 10 whether the frame is completely expanded or retracted.

To use the air filter with a computer having a bottom mounted air intake vent, the arms of the filter frame 10 are adjusted to a desired length and the upper surface of the frame is attached to the bottom surface of the housing. The filter border 22 is cut so that the filter element tightly fits within the adjusted frame 10, and the filter element 20 is slid therein. The filter may also be attached over an air intake vent on the back of a computer housing 4, in which case the foot pads may either be omitted or positioned facing away from the computer. Exhausted filters are easily replaced by simply sliding the filter 20 out of the frame 10 and sliding a clean filter 20 therein. The frame according to the present invention is preferably constructed with plastic or a similar equivalent while the central filter panel is constructed with a material similar to that found on conventional air filters, or any other suitable material that effectively removes airborne particulates while allowing air to pass therethrough. However, as will be readily apparent to those skilled in the art, the size, shape and materials of construction of the various components may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a computer having a housing with at least one air intake vent thereon, an adjustable air filter assembly for preventing airborne particulates from passing through said air intake vent, said air filter assembly comprising:

an adjustable frame assembly for peripherally surrounding varying size air intake vents, said frame including a plurality of spaced foot pads on a side thereof for suspending said frame a predetermined distance from a supporting surface;

an adjustable filter element slidably received within said frame assembly;

means for attaching said frame assembly to said computer housing so that said filter element is positioned over said air intake vent.

2. A device according to claim 1 wherein said means for attaching said air filter assembly to said computer housing includes a hook and loop fastener on said computer housing and a mating hook and loop fastener on said frame assembly.

3. A device according to claim 1 wherein said filter element includes a substantially rectangular border member constructed with a trimmable material allowing the size of the filter element to be adjusted to fit within the frame.

4. A device according to claim 3 wherein said filter element border is peripherally attached to a central panel, said panel constructed with an air permeable material that prevents airborne particulates from passing through.

* * * * *